Figure 1:
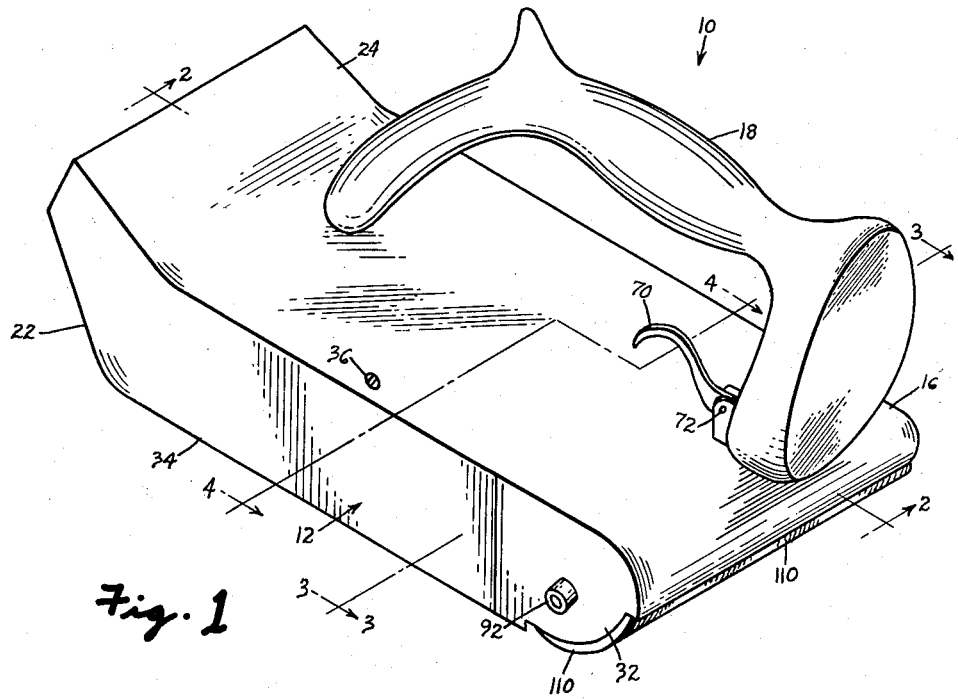

June 10, 1958  F. A. ZITO  2,838,195
TAPE DISPENSER

Filed Aug. 12, 1954  2 Sheets-Sheet 1

INVENTOR
FREDERICK A. ZITO

BY
ATTORNEYS

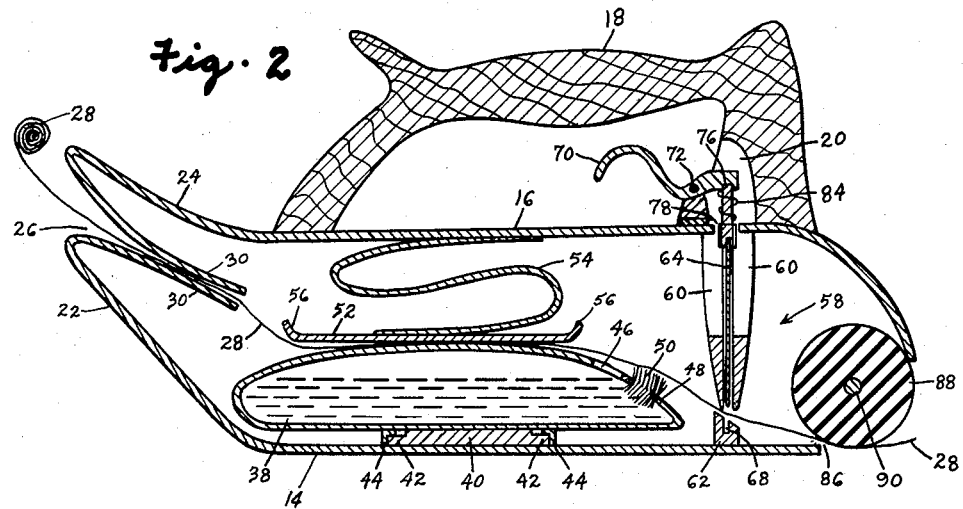
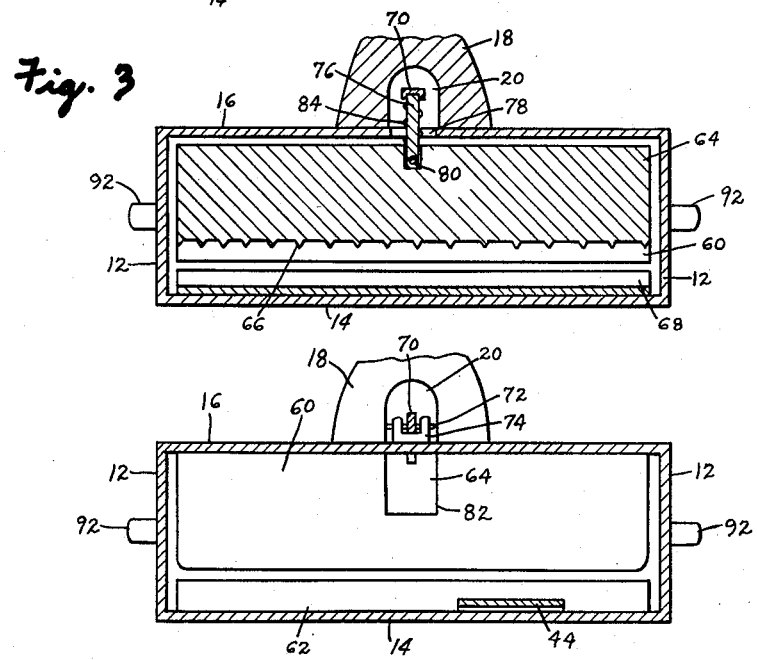

United States Patent Office 2,838,195
Patented June 10, 1958

2,838,195

TAPE DISPENSER

Frederick A. Zito, Yorktown, Va.

Application August 12, 1954, Serial No. 449,532

2 Claims. (Cl. 216—22)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in tape dispensers and is particularly adapted to allow a tape to feed through the dispenser and to be torn off without waste.

The usual tape dispenser in use today provides a roller that is moistened and the tape is drawn over the top of the roller, cut or torn off, and then applied at the place to be sealed. This involves the use of both hands of the operator, in addition to guessing how much tape is required to effect the sealing. Other dispensers allow the tape to be drawn through the device, being moistened by a roller or brushes during this step, after which the tape is torn off at the selected length. Again, the exact length of tape required is generally guessed at, resulting in patch-work sealing, or in waste. The present invention avoids both difficulties. In the device used, tape is passed through the machine, is moistened, and as the wet end protrudes, is applied directly to the package edge to be sealed. The machine is then moved away, and with the end in fixed position on the package, tape is withdrawn and applied at once. When the sealing step is completed, the tape is torn off at that point, and no waste occurs. Thus, both time and material are saved.

The general object of the invention is to moisten and apply gum paper to seal a package and cut the paper in a single operation.

An important object of the invention is to provide a device that is carried by one hand in the moistening and feeding step, thereby leaving the other hand free to apply the tape to the package as the tape is being withdrawn.

Another important object of the invention is to eliminate the necessity for measuring or estimating the length of gum tape required by applying the tape directly as it is used, thereby eliminating the waste normally occurring in such procedures.

Still another object of the invention is to eliminate unnecessary time consumption by moistening and applying the gum tape in a single step.

Yet another object of the invention is to provide means on the dispenser to allow the gum tape to be cut away when the sealing step is complete.

It is a feature of the invention to provide a dispenser that is compact in design to permit the use of a large reservoir for the liquid required to moisten the gum tape, thereby avoiding the necessity for frequent stops during operation, to refill the reservoir.

Figure 5:
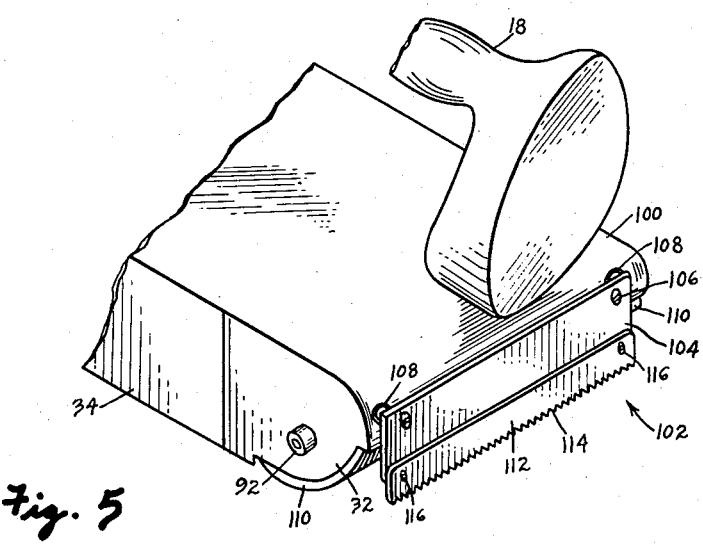

Other objects and many of the attendant advantages of this invention will be readily appreciated as the same becomes better understood by reference to the following detailed description when considered in connection with the accompanying drawings wherein:

Fig. 1 is a perspective view of one form of the tape dispenser,

Fig. 2 is a longitudinal section of the dispenser and is taken on line 2—2 of Figure 1, Fig. 3 is a section taken on line 3—3 of Figure 1 and illustrates a detail of the invention, Fig. 4 is a section taken on line 4—4 of Figure 1 and illustrates a detail of the invention, the liquid reservoir having been removed, and Fig. 5 is a perspective detail of a modification of the invention.

Referring to Figures 1 to 4, the dispenser of the invention comprises a container or housing member 10 and consists of sides 12, a base 14 and a closure cover 16. A handle 18 is mounted on cover 16 in any suitable manner. Handle 18 is provided with a large slot or recess 20, for a purpose soon to be made clear.

One end of base 14 is bent upwardly at 22 towards cover 16. Cover 16 is also bent upwardly at 24 but at a less acute angle than section 22. Thus, as is most clearly evident from Fig. 2, sections 22 and 24 approach each other to form a lip with a longitudinal opening or slot 26 for entry of the free end of a gum paper roll 28. Extending inwardly from the outer edges of lip members 22 and 24 are flanges 30 designed to guide tape 28 in its initial entry into the dispenser.

One of the side members 12, is in two sections, with roller section 32 and removable plate 34. Plate 34 is attached by any desired means 36 in the dispenser, and is removed to permit access to reservoir 38. Reservoir 38 is preferably of as large a size as is practicable and provides the liquid holding means by which the gum edge of the tape is moistened. Reservoir 38 is removably received within the dispenser by means of a depending flange 40 having extension flanges 42 which slidably engage complementary inverted L-shaped tracks 44 secured on base 14. With side plate 34 removed, reservoir 38 is removed by being slid outwardly on tracks 44. A liquid receiving hole or aperture 46 is the means by which water is supplied to the reservoir. An elongated slot 48 of narrow diameter, is provided adjacent one edge of reservoir 38 and receives tightly therein an applicator 50. Applicator brush 50 extends partly into the reservoir and below the liquid level, and extends partly above the container, as is illustrated in Figure 2. The action of applicator 50 is similar to that of a wick, and enables water in reservoir 38 to travel to the exposed portion by means of capillary action. When the reservoir is filled with water, it is slid into position within dispenser 10 along tracks 42. Reservoir 38 is preferably as wide as the inside diameter of the dispenser. Thus, when plate 34 is bolted back into position, there is no possibility for lateral movement of the reservoir. Vertical movement is also prevented by the L-shaped tracks 44, which securely hold the reservoir in position.

A flat guide or pressure plate 52 serves the dual function of guiding the movement of gum tape 28 and urging reservoir 38 against the bottom of the dispenser. Spring 54 seats on pressure plate 52 and against cover 16 to urge pressure plate 52 against the top of reservoir 38. When tape 28 passes through dispenser 10, it is received between pressure plate 52 and reservoir 38. Spring 54 presses plate 52 against the top of the reservoir, tensioning gum tape 28 during movement. The edges 56 of guide pressure plate 52 are curved slightly to enable the gum tape to more easily be passed between the pressure guide plate and the reservoir. Obviously, spring 54 may assume any shape, and may be loosely retained in the device, or may be fixed at one extremity to guide plate 52 or to cover 16.

Adjacent the end of reservoir 38 is secured perforating means 58. A pair of opposed guide bars 60 are mounted in spaced relation to each other and are suspended from dispenser cover plate 16 to overlie an anvil or block 62 mounted directly below, on base 14. Guide bars 60 also function as guard means for a perforating blade 64, positioned for vertical reciprocating movement between guide bars 60, and including perforating teeth 66. Blade 64 is adapted to be lowered across tape 28 and to be received in a groove 68. By this operation, the gum tape is perforated but not cut, and is then adapted to be withdrawn beyond the end of dispenser 10 to be torn along the perforations. Anvil 62 has an inclined upper surface to help guide tape 28 towards the exit opening 86.

Perforating blade 62 is actuated by means of trigger 70 mounted for pivoted movement at 72 between a pair of vertical studs or bosses 74 extending above cover 16. The rear end of trigger 70 is housed within slot 20 of handle 18 and is provided with a depending stem 76 which extends through an aperture 78 in cover 18 and is secured on cutter blade 64 at 80. If necessary, clearance for stem 76 is provided by means of slots 82 in guide bars 60. Obviously, where stem 78 is integral with blade 64, the necessity for slot 82 no longer exists, and is eliminated. A tension spring 84 is coaxial with stem 76 and abuts cover plate 16 and trigger 70 to normally urge perforating blade 64 upwardly in retracted position. When the tape is to be perforated, trigger 70 is pulled upwardly towards handle 18, against the force of spring 84, to move stem 76 and perforating blade 64 downwardly through tape 28 and into groove 68 of block 62. It is generally desirable to position trigger 70 as close to the forward end of handle 18 as is practical, since the index finger or the next adjacent finger could be used to pull up the trigger. This provides ease of operation and no shifting of the hand holding the handle when the tape is to be severed. As a result, fatigue is not apt to occur during normal use of the device.

As the tape is carried forward beyond the perforating blade, it is passed through a large opening 86 at the forward end of dispenser 10 which is blocked by a rubber roller 88 mounted for rotation on shaft 90 extending between sides 12 and journaled at 92. Roller 88 provides tension means for gum tape 28 as it is applied directly to the package.

The operation of the device is readily apparent. Gum tape 28 is fed into inlet opening 26 and under pressure plate 52. The space between guide flanges 30 is just sufficient to receive the gum tape. Pressure guide plate 52 provides resilient means to maintain the gum tape in position for movement over adjoining brushes 50, which moisten the gummed side. The now wet tape is pulled beneath knife 64 and under tensioning roller 88. The exposed end of gum tape 28 is applied directly to the package being sealed and the dispenser is moved backwards. Sharp edges are avoided by the angle formed by section 22 and the dispenser moves smoothly. The other hand is now free to guide and tack down the newly exposed wet gum tape. A short distance before the end of the package being sealed is reached, trigger 70 is drawn upwards by the finger of the same hand moving the machine, causing perforating blade 64 to move downwards to perforate the tape. The trigger is released and tension spring 84 enables the blade to be recessed again between guide bars 60. The dispenser is then moved backwards until the perforated portion is exposed and the tape is torn off at this point and applied to the end of the package. Enough of the free end of the tape remains exposed to be grasped by the free hand for application to the next package.

The device is capable of being modified to eliminate any moving parts. A simplified machine, and one that may be manufactured at low cost, is thus provided. Fig. 5 illustrates in detail an example of such modification. The construction of dispenser 100 is similar in all respects to that of Figures 1–4, except that the perforating means 58 is eliminated and cutting means 102 is attached to the roller end of the tape dispenser. Cutting member 102 comprises a spacing plate 104 attached at 106 to dispenser 100. Spacing washers 108 assist in spacing plate 104 from roller 110. A cutting blade with serrations 114, is attached to plate 104 at 116. The entire assembly terminates slightly above the bottom of dispenser 100 to provide clearance for tape 28 as it is drawn through the device. If desired, cutting blade 112 could be made adjustable on the spacing plate.

The operation is similar to that of the device of Figures 1 to 4. When the edge of the package being sealed is reached, the dispenser is tilted, with roller 110 being used as the pivot. This brings the serrated edge 114 of knife blade 112 into contact with the top of gum tape 28. A twisting motion of the dispenser will tear the tape along the knife edge, thereby cutting off the exact amount of tape required to seal the package eliminating guesswork and avoiding any waste.

It is obvious that the objects of the invention have been attained. It is no longer necessary to estimate the required length of tape that is to be used, and the gum tape now may be applied directly to the package as it is being moistened, since it requires only one hand to operate the tape dispenser while the other is free to guide the tape. As a result, a considerable saving in operating time is attained.

Obviously many modifications and variations of the present invention are possible in the light of the above teachings. It is therefore to be understood that within the scope of the appended claims the invention may be practiced otherwise than as specifically described.

What is claimed is:

1. A gum tape dispenser comprising a housing, tape inlet and outlet means in said housing, liquid supply means mounted between said inlet and outlet means, said liquid supply means comprising a reservoir having a depending boss, grooves in said boss, and track means in said housing receiving said boss for sliding movement of said reservoir, an aperture in said housing, a perforating knife receiprocable vertically in said housing, a trigger secured pivotally on said housing, a stem connecting said knife and trigger extending through said aperture, tension means on said stem urging said trigger into inoperative position, a block member mounted below said perforating knife, and a groove in said block member aligned with said knife, said block member having an inclined guide surface.

2. The combination of claim 1, and a pair of guide bars positioned on each side of said perforating knife.

References Cited in the file of this patent

UNITED STATES PATENTS

| | | |
|---|---|---|
| 1,307,891 | Berkowitz | June 24, 1919 |
| 1,644,262 | Mason | Oct. 4, 1927 |
| 2,100,652 | Shimer | Nov. 30, 1937 |
| 2,368,262 | Oftedahl et al. | Jan. 30, 1945 |
| 2,487,351 | Marsh | Nov. 8, 1949 |